(12) United States Patent
Stoianovici et al.

(10) Patent No.: US 7,247,116 B2
(45) Date of Patent: Jul. 24, 2007

(54) PLANETARY MOTOR

(75) Inventors: Dan Stoianovici, Baltimore, MD (US); Louis R. Kavoussi, Lutherville, MD (US)

(73) Assignee: The John Hopkins University, Baltimore, MD (US)

( * ) Notice: Subject to any disclaimer, the term of this patent is extended or adjusted under 35 U.S.C. 154(b) by 0 days.

(21) Appl. No.: 11/501,098

(22) Filed: Aug. 8, 2006

(65) Prior Publication Data

US 2007/0034047 A1    Feb. 15, 2007

Related U.S. Application Data

(62) Division of application No. 10/666,213, filed on Sep. 18, 2003, now Pat. No. 7,086,309.

(60) Provisional application No. 60/411,906, filed on Sep. 19, 2002.

(51) Int. Cl.
F16H 1/32   (2006.01)
F16H 33/00  (2006.01)

(52) U.S. Cl. ............................. 475/162; 74/640

(58) Field of Classification Search ............. 475/162, 475/163, 165, 176, 177, 178; 74/640, 82, 74/411

See application file for complete search history.

(56) References Cited

U.S. PATENT DOCUMENTS 3,088,333 A * 5/1963 Walton .................. 74/640
3,169,202 A   2/1965 Proctor et al. ........... 74/640
3,200,668 A   8/1965 Janes ..................... 74/640
3,362,254 A   1/1968 Lewis .................... 74/640
4,479,403 A  10/1984 Marschner et al. ........ 74/640
4,506,590 A   3/1985 Miki et al. ............... 91/35
5,060,539 A  10/1991 Cissell et al. ............ 74/640
5,643,128 A   7/1997 Kennedy ................ 475/168
6,016,715 A   1/2000 Hofmann ................ 74/110
6,155,220 A  12/2000 Marriott .............. 123/90.17
6,258,007 B1  7/2001 Kristjansson .............. 477/7
6,314,835 B1 11/2001 Lascelles et al. ......... 74/640

FOREIGN PATENT DOCUMENTS

JP           355107149 A   *   8/1980   ............ 475/178

* cited by examiner

Primary Examiner—Roger Pang
(74) Attorney, Agent, or Firm—Larry J. Guffey (57) ABSTRACT

A motor suitable for use in a medical imaging environment has (a) a cylindrical outer gear having a bore with a centerline and an internal surface with circumferentially distributed and radially directed teeth, (b) a means for mounting this outer gear such that it is constrained to move in rotational motion about its centerline, (c) a cylindrical planetary gear having a bore and an external surface having circumferentially distributed and radially directed teeth, (d) a means located within the planetary gear bore for applying a fluid pressure driven force to cause it to move in translational-circular motion about the outer gear's centerline, and (e) wherein the teeth of these gears are configured so as to cooperate such that the translational-circular motion of the planetary gear causes the rotational movement of the outer gear.

8 Claims, 10 Drawing Sheets

SECTION B-B (PRIOR ART)

(PRIOR ART)

FIG. 3A

Piston Rod Roller

FIG. 3B

Cam Bearing (PRIOR ART)

SECTION A-A

SECTION B-B

PLANETARY MOTOR

CROSS-REFERENCE TO RELATED APPLICATION

This application is a divisional of U.S. patent application Ser. No. 10/666,213 filed Sep. 18, 2003, entitled "Planetary-Harmonic Motor," by Dan Stoianovici and Louis R. Kavoussi, which issued as U.S. Pat. No. 7,086,309. The 10/666,213 application claimed the benefit of U.S. Provisional Patent Application No. 60/411,906, filed Sep. 19, 2002 by Dan Stoianovici and Louis R. Kavoussi. The teachings of these prior materials are incorporated herein by reference in their entirety to the extent that they do not conflict with the teaching herein.

STATEMENT AS TO FEDERALLY SPONSORED RESEARCH

This invention was made with Government support under Grant No. 1 R21 CA88232-01A1 and entitled "Multi-Imager Compatible Robot For Prostrate Access," which was awarded by the National Institute of Health. The Government may have certain rights in this invention.

BACKGROUND OF THE INVENTION

1. Field of the Invention

This invention relates to motors that provide rotary motion. More particularly, one embodiment of the present invention relates to a motor which is constructed from materials that can be used in all classes of medical imaging equipment and that generates precise, high torque, backlash-free rotary motion without using electricity.

2. Description of Prior Art

Noninvasive, diagnostic imaging techniques, such as ultrasound, x-ray and magnetic resonance imaging (MRI) are widely used in medicine. They are used to produce cross-sectional images of a patient's organs and other internal body structures.

MRI typically involves the patient lying inside a large, hollow cylinder containing a strong electromagnet, which generates a strong and uniform magnetic field that causes the electrons in a patient's body to spin in a uniform and predictable manner. The MRI equipment can then manipulate the spinning electrons and use the resulting information to generate an image of the inside of a patient's body.

However, difficulties are encountered in obtaining accurate images when disruptions and deflections in the magnetic field are experienced due to the presence in the field of materials that produce a magnetic field and/or are susceptible to producing their own magnetic fields when placed within an external magnetic field.

One source of magnetic field distortion can be equipment such as motors that are in the vicinity of the MRI machine. Motors are generally formed with materials that produce a magnetic field. Examples of such materials that are commonly used in motors include iron and brass. Thus, when placed in the field generated by the MRI machine, the motors can cause artifacts in the image of the patient's body.

Other forms of medical imaging (e.g., x-ray and ultrasound imagers) are also seen to have similar problems of distortions in their output images due to the presence of motors in the vicinity of the imaging equipment.

Prior attempts to provide a motor that can be used in such imaging environments have involved the use of piezoelectric elements to provide the motor's power. See U.S. Pat. Nos. 5,233,257 and 6,274,965.

Despite these efforts, there still exists a need for improved motors that can be placed near medical imaging equipment with minimal risk of creating artifacts. There is a related need for a motor that does not produce a magnetic field. There is yet another need for a motor that has a low susceptibility of being induced to produce a magnetic field. Additionally, there is a need for a rotary motor of the type that is not powered by electricity.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide a rotary motor that can be used for medical applications which require the motor to be located in or in close proximity to medical imaging equipment.

It is another object of the present invention to provide a rotary motor that can be used in a surgical environment.

It is yet another object of the present invention to provide a motor that can provide precise, high torque, backlash-free rotary motion.

It is still another object of the present invention to provide a rotary motor that does not utilize electrical power or electrical components for operation.

It is a further object of the present invention to provide a precise rotary motor whose motion can be monitored by sensors located at a site that is distant from the location of the motor itself.

It is an object of the present invention to provide a rotary motor that can be powered by other than electrical means.

These and other objects and advantages of the present invention will become readily apparent as the invention is better understood by reference to the accompanying summary, drawings and the detailed description that follows.

SUMMARY OF THE INVENTION

Recognizing the medical needs for the development of a precise rotary motor that can be used in medical imaging environments, the present invention is generally directed to satisfying the needs set forth above. In accordance with the present invention, the foregoing need can be satisfied by providing an especially designed planetary motor that is suitable for use in a medical imaging room.

In a preferred embodiment, such a planetary motor has: (a) a cylindrical outer gear having a bore with a centerline and an internal surface with circumferentially distributed and radially directed teeth, (b) a means for mounting this outer gear such that it is constrained to move in rotational motion about its centerline, (c) a cylindrical planetary gear having a bore and an external surface having circumferentially distributed and radially directed teeth, (d) a means located within the planetary gear bore for applying a fluid pressure driven force to cause it to move in translational-circular motion about the outer gear's centerline, and (e) wherein the teeth of these gears are configured so as to cooperate such that the translational-circular motion of the planetary gear causes the rotational movement of the outer gear.

In a second preferred embodiment, the present invention takes the form of a method whose steps yield the planetary motor described above.

Thus, there has been summarized above, rather broadly, the present invention in order that the detailed description that follows may be better understood and appreciated.

There are, of course, additional features of the invention that will be described hereinafter and which will form the subject matter of the claims to this invention.

DETAILED DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

In general, the present invention relates to motors that are made with materials that have low magnetic susceptibility and produces minimal, if any, magnetic fields. For example, materials such as plastics, glass, ceramics, rubbers, etc.

The motors present herein are generally based on two principles of transmission: (a) the coupled, fluid actuated pistons or cylinders for supplying linear motion at a remote location, and (b) the harmonic drive transmission for providing extremely precise, zero-backlash speed reduction capabilities.

Figure 1A:
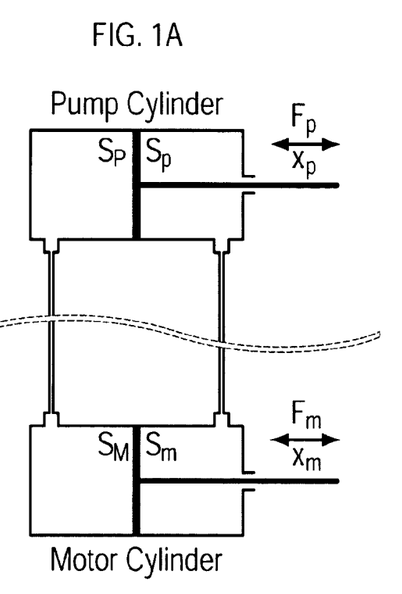
FIGS. 1A and 1B illustrate the operation of a pair of coupled hydraulic cylinders for remotely actuating a linear motion.
Figure 1B:
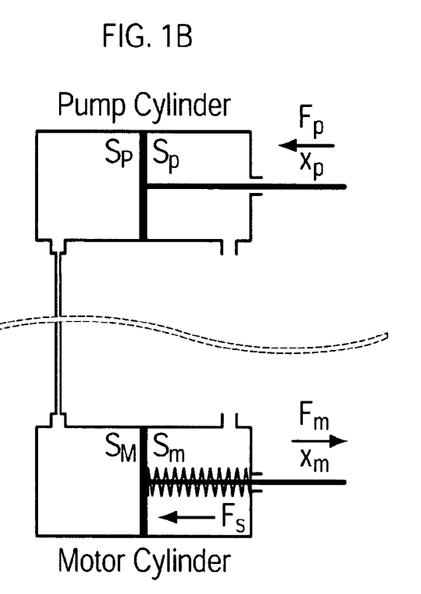

Two versions of the coupled, fluid actuated pistons are schematically represented in FIGS. 1A and 1B. The "double acting" method presented in FIG. 1A includes two cylinders connected port-to-port on their similar sides by two closed circuits. The fluid agent inside these circuits could be either pneumatic or hydraulic. An external force applied on the rod of the "pump cylinder" is transmitted through the compression of the agent into linear force at the piston of the "motor cylinder", like in the braking system of cars.

The force transmission ratio of the motor-pump cylinder coupling may be expressed as:

$$\text{Force Transmission Ratio} = T = \frac{F_m}{F_p} = \frac{S_M}{S_P} = \frac{S_m}{S_p} \qquad \text{Equation 1}$$

where, $F_m$ and $F_p$ are the forces acting on the motor and pump rods respectively, and $S_M$, $S_m$, $S_P$, $S_p$ are the surface areas on the sides of both pistons, as represented in FIG. 1. Scaling may be achieved by using different cylinder sizes for the pump and motor.

Using an incompressible agent (hydraulic actuation case) and considering that the system operates at low pressure levels for which the deformation of the hydraulic circuit is negligible, the displacement ratio may be expressed as the inverse of the force ratio:

$$\frac{x_m}{x_p} = \frac{1}{T} \qquad \text{Equation 2}$$

where, $x_m$ and $x_p$ are the displacements of the motor and pump pistons, respectively. Equation 1 also reveals the size constraint of the cylinders in order to match the volumes displaced on both sides of the piston chambers.

The "spring return" principle presented in FIG. 1B is similar but uses a single connection line between the cylinders thus reducing to half the number of conduits required. This can be significant in the case of multiple motors. The back draw is the limitation and variability of force in one direction given by the spring (of elastic constant k) used in the motor cylinder:

$$F_m = F_p - F_s \Rightarrow T = \frac{F_p - kx_m}{F_p} \qquad \text{Equation 3}$$

Several characteristics of the cylinder coupling actuation principle are essentially related to medical imaging compatibility:

(a) The scheme allows for the operation of the motor cylinder from a remotely located pump cylinder. This allows the motor located in the imaging field to be operated from a pump located in a control room.
(b) The simplicity of the motor allows for its construction of imaging environment compatible materials. The fluid agent used is also nonrestrictive.
(c) The motion of the motor rod can be predicted by measuring motion at the pump. Accuracy of measurement is increased by using hydraulic agent (incompressible) and low expandability circuitry. This eliminates the need of performing complicated motion encoding in close proximity of the imaging field.

These characteristics show that this remote actuation principle is well suited for performing linear motion actuation in a medical imaging environment. The method may also be extrapolated for rotary motion, as presented next.

Figure 2:
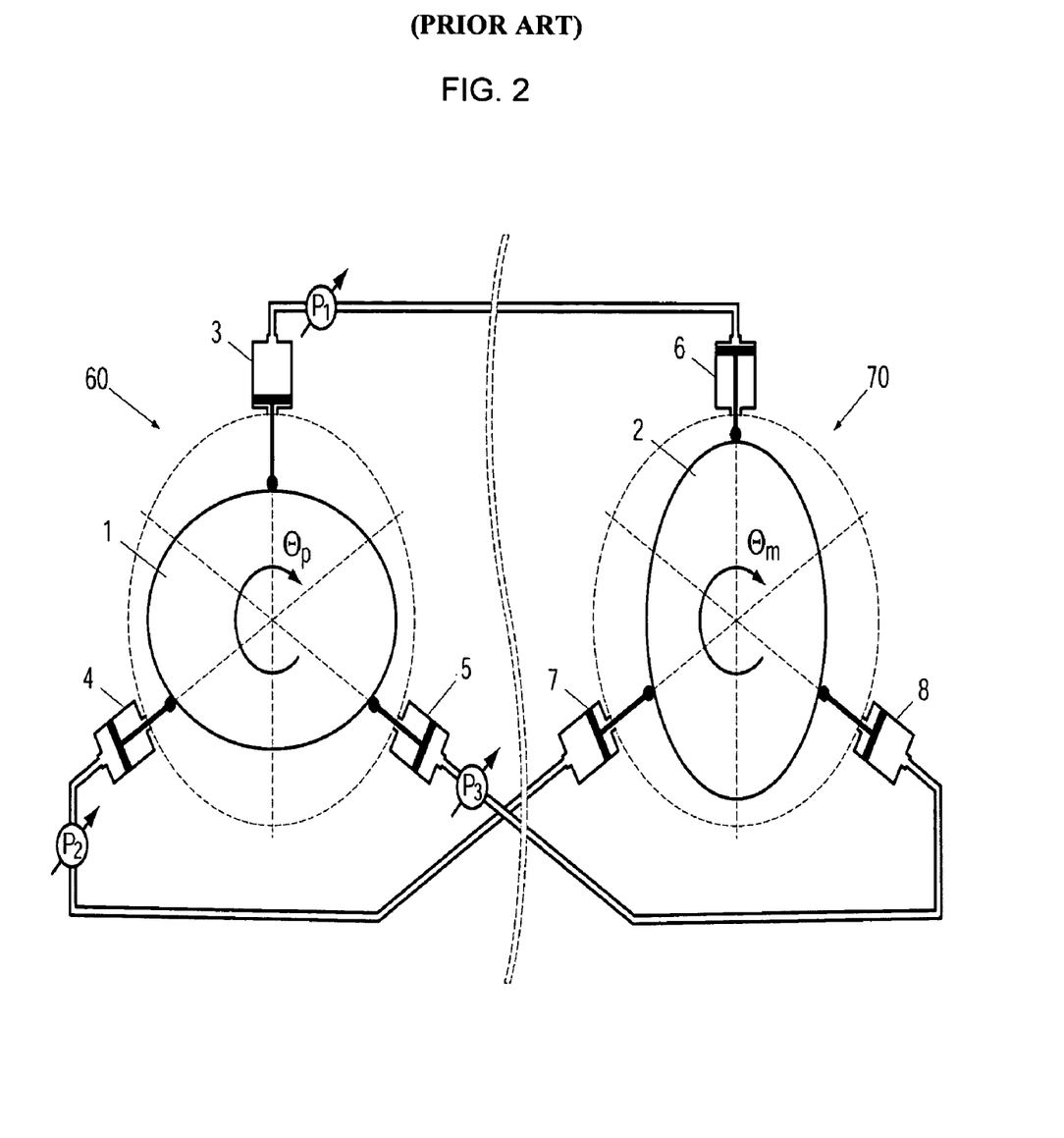
FIG. 2 illustrates the operation of three sets of coupled hydraulic cylinders for remotely actuating a rotary motion.

Rotational output may be achieved by using at least three coupled pistons or cylinders engaging an elliptical shaft as presented in FIG. 2. In this schematic three sets of cylinders 3-6, 4-7, and 5-8 are linearly coupled as presented in the previous section. The cylinders are equally spaced around the elliptical cams 1 and 2 of the pump 60 and motor 70 respectively. Rotating the cam 1 of the pump causes the pistons 3, 4, and 5 to move, engaging their coupled pistons 6, 7, and 8 respectively, thus turning the motor cam 2. In this way, the pump and the motor shafts are coupled, so that ideally their rotation angles are equal $\Theta_m = \Theta_p$. Proper design of the cams and cylinder sizes ensure that the volume in the hydraulic circuits remains constant for any pump $\Theta_p$ and motor $\Theta_m$ rotation angles.

As for the cylinder coupling for linear motion, an incompressible fluid is required in order to achieve high accuracy of motion since rotational precision is directly related to the linear precision of the pistons. A low compressibility fluid is also required for high speed operation. This also allows for performing remote measurement of the motor shaft rotation using a pump encoder.

A stepper pneumatic motor could be achieved by replacing the pump arrangement presented in FIG. 2 with a simple pneumatic source and distributor that successively pulse pressurizes the three pistons of the motor, much like a radial engine used in old propeller airplanes.

The cam pump presented in FIG. 2 can also be replaced by (at least) three cylinders operated independently by linear drives such as voice coils. These should be synchronized and optimized for maximum dynamic performance under computer control.

In all cases, tight seal cylinders should be used since agent leakage would degrade kinematic performance. For this reason the use of diaphragm cylinders is recommended over the piston type. Diaphragm cylinders are also suitable since the stroke required is relatively small and such cylinders can be easily made of medical imaging compatible materials.

Remote position sensing can also be achieved with this coupling principle. For a theoretically zero driven torque, the pump and motor rotations are in phase. The phase shift $\Phi$ depends on the load connected to the motor shaft. This can be quantified by monitoring line pressures ($P_1$, $P_2$, $P_3$, . . . ) and then used to evaluate the phase shift, thus:

$$\Theta_m = \Theta_p - \Phi(P_1, P_2, P_3, \ldots)  \quad \text{Equation 4}$$

This is essentially important for applications in which encoding of the motor shaft is not feasible or difficult to implement, as for medical imaging environment applications.

Figure 3A:
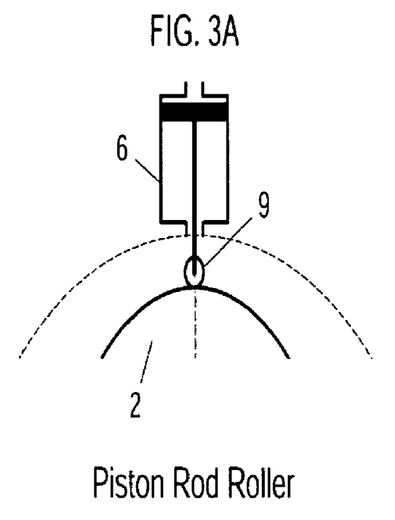
FIGS. 3A and 3B illustrate the use of rollers and a cam bearing for connecting the piston rods of the hydraulic cylinders shown in FIG. 2 with an elliptical drive cam.

The disadvantage of this principle is related to the sliding of the piston ends on the elliptical cams during motion, which induces sliding friction at the contact surfaces thus reducing mechanical performance and causing wear. Design implementations of this principle require the inclusion of either rollers 9 at the end of the pistons or preferably a series of ball bearings 10 mounted on the perimeter of the cam. See FIGS. 3A and 3B.

A harmonic drive transmission is a rotational—rotational transmission implementing torque coupling with concentric elements. A radial, rather than a rotation, tooth mesh is created by flexing one element to create an inward and outward, radial tooth motion, which allows a spline-like tooth engagement.

Figure 4:
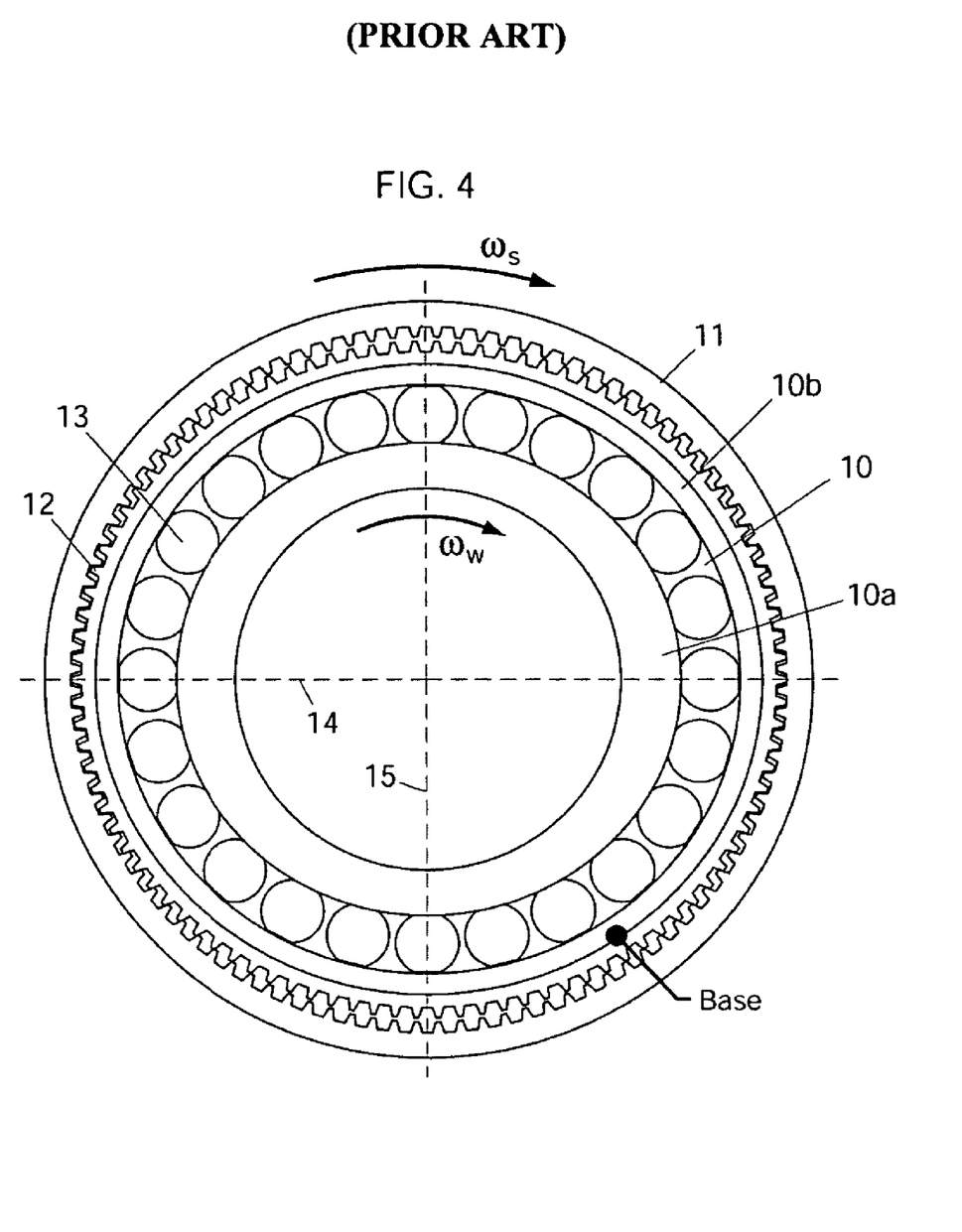
FIG. 4 illustrates the components of and principle of operation of a standard harmonic drive gear.

A harmonic drive transmission's precision and efficiency make it suitable for accurate positioning and precise motion control. The basic principle of the harmonic drive is illustrated in FIG. 4. It presents three basic elements: A rigid circular spline or the internal gear 11, a flexspline represented by the thin gear 12, and an elliptical wave generator 13 which is surround by a ball bearing 10 having inner 10a and outer 10b races. Commonly, the input is applied to the wave generator 13. The output is either the circular spline 11, as represented in FIG. 4, in which the flexspline 12 and the generator 13 are grounded, or vice versa (11 grounded and 12 output).

The circular spline 11 has an even number of internal teeth ($N_S$), is circular, and rigid. The flexspline 12 also presents an even number of teeth ($N_F$), but fewer than the spline (typically $N_F = N_S - 2$), presents a thin cross-section, and is constructed of flexible materials so that it can be deformed to an oval shape by the wave generator 13. The wave generator is an elliptical bearing presenting a major axis 14 and a minor axis 15. The teeth engage at the major axis and are fully disengaged at the minor axis. The flexspline 12 is deformed by the bearing 10 to an elliptical shape changing its orientation with the rotation of the inner ring of the bearing, the drive input, thus rotating the axes of the ellipse. This causes the gear engagement region to rotate in phase with the input. Since the flexspline 12 has ($N_S - N_F$) fewer teeth than the circular spline 11, one revolution of the input causes a relative motion of $N_S - N_F$ teeth between them. For the common case of two teeth difference, the output rotates one tooth-arc for each 180° of input rotation. In general, the transmission ratio of the harmonic drive can be expressed as:

$$T = \frac{\omega_W}{\omega_S} = \frac{N_S}{N_S - N_F} \quad \text{Equation 5}$$

If the spline 11 is considered the base, the direction of the output $\omega_S$ is reversed with respect to the input $\omega_W$.

Equation 5 shows that the harmonic drive exhibits high transmission ratios from 50:1 and up. Preload in the direction of the major axis and almost pure radial tooth engagement allow harmonic drives to operate with low or zero backlash for long duty cycles, without preload adjustments or significant wear. Reliability and life are also high. Since torque is transmitted by pure coupling, the efficiency of the transmission is normally in the 80-90% range. The gearing design ensures that approximately 10% of the total teeth are engaged at any rotation, minimizing the effect of tooth-to-tooth error, thus rendering excellent positioning accuracy and repeatability.

The above characteristics make the harmonic drive an ideal candidate for precision surgical robotics. In addition, the presence of the elliptical wave generator 13 readily associates functionality with the elliptical coupling presented above, especially for the cam bearing case presented in FIG. 3B.

By merging the principles of elliptical coupling and harmonic drive by using cylinder couplings to actuate a wave generator or actuator we achieve what is herein referred to as a harmonic motor. See FIG. 5.

Figure 3B:
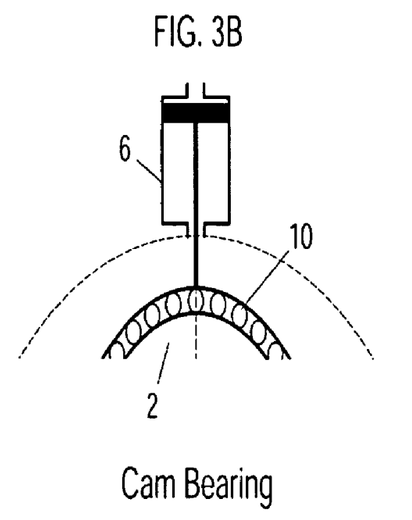
Figure 5:
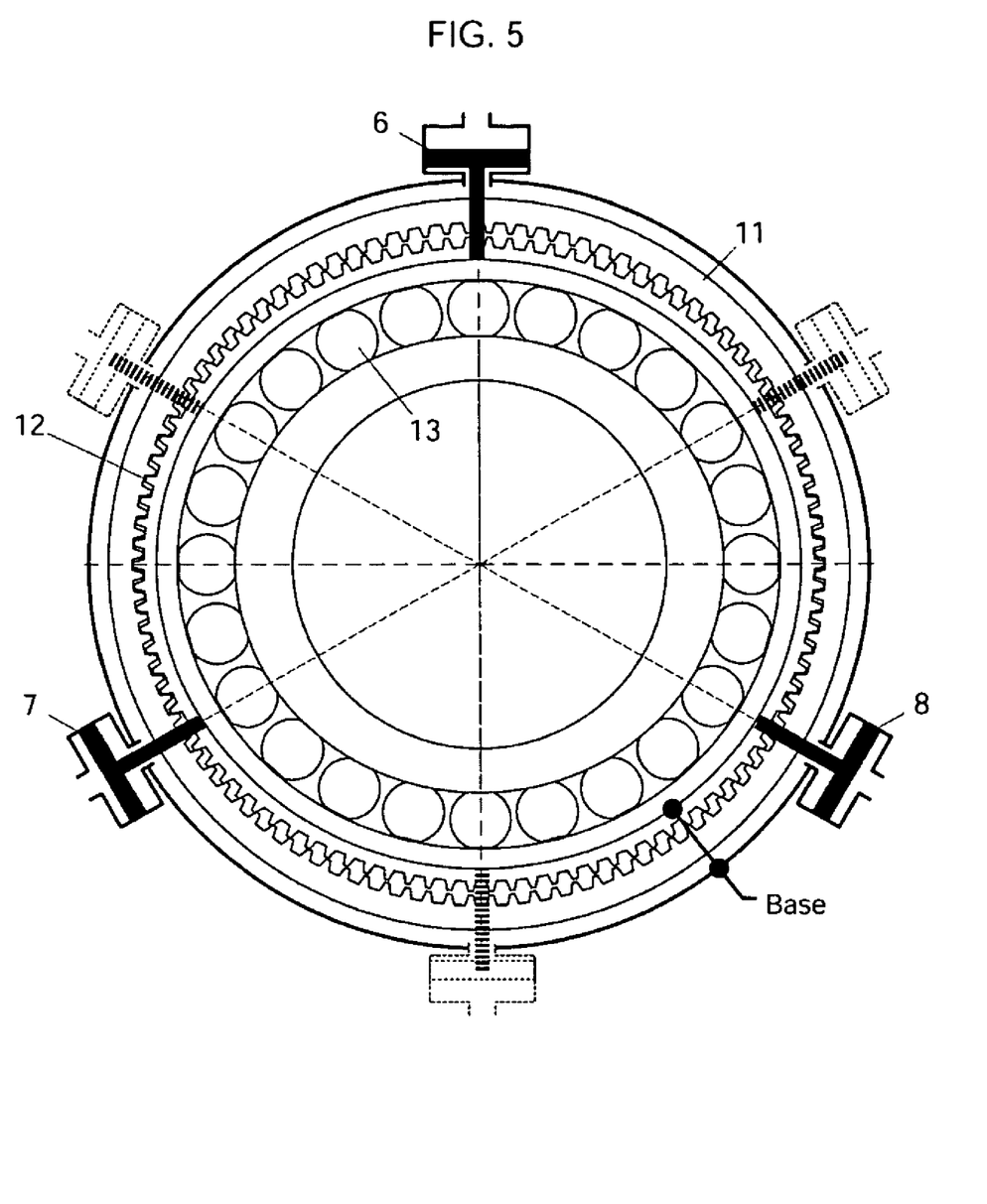
FIG. 5 is a plan view of a harmonic motor which utilizes an elliptical bearing or wave generator that is driven by hydraulic cylinders that are sequentially operated.

Pistons 6, 7, and 8 act on the outer race of the bearing 10, similar to the principle presented in FIG. 3B. The wave generator 13 is rotated by sequential pulsing of the pistons, either by using an elliptical pump arrangement or by pumps actuated independently. A set of mirrored cylinders may also be respectively connected on the same fluid circuits for reducing radial load.

The main difference compared to the harmonic drive disclosed herein is that the input energy is given by the fluid of the pistons and not a rotational input, thus rendering a rotary motor rather than a transmission. The motor inherits the mechanical performance of the cylinder coupling and harmonic drive, making it optimally suited for precision actuation and medical imaging compatibility.

The harmonic motor is also safe to use in surgical applications, especially when driven by a hydraulic agent such as distilled water or even saline. All hydraulic circuits are closed and can be made leak proof by using diaphragm cylinders. The fluid pulses back and forth in the circuits and the system may be operated at low pressures. Should a hydraulic circuit fail, the motor stalls. Moreover, the drive can be made backlash free and it is non-backdrivable if the pump is non-backdrivable.

A "static wave actuator" version of this harmonic motor presents simpler construction and minimizes the number of moving elements by replacing the elliptical bearing 10 with an arrangement of cylinders which act as a active wave generator. The flexspline remains fixed but its oval shape is dynamically driven by cylinder couplings. Two types of wave actuators are defined based on the direction that the cylinders act, radial and tangential.

Figure 6:
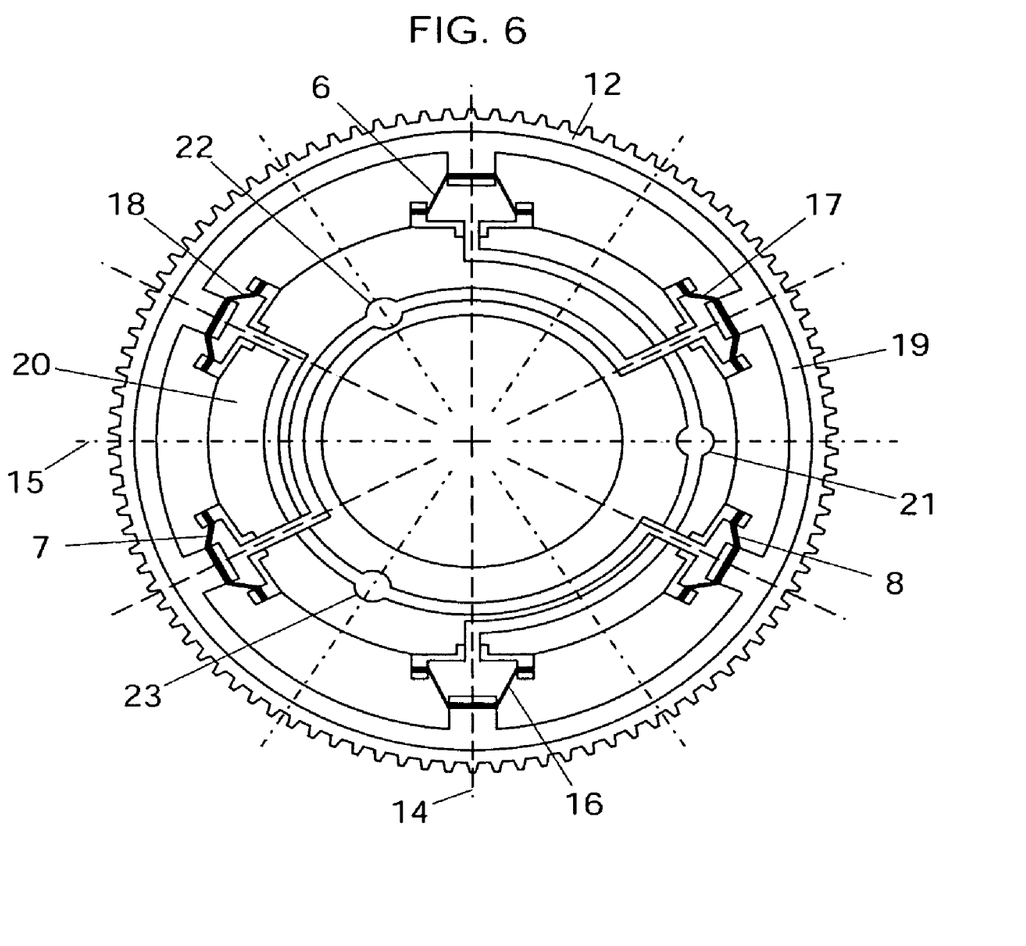
FIG. 6 is a plan view of a "radial wave actuator" that replaces the elliptical, wave generator of FIG. 5 with sequentially activated pairs of diaphragms that directly deform the flexspline.

FIG. 6 presents a schematic of the radial wave actuator and the flexspline 12. For simplicity the rigid, circular spline 11 has not been represented in this schematic being similar to the one represented in FIG. 5.

The radial wave actuator comprises a flexible outer ring 19, a series of at least six diaphragm cylinders 6, 7, 8, 16, 17, 18 and a rigid cylinder ring 20 or platform. The flexspline 12 and the outer ring 19 are assembled or even constructed of in single part. Pairs of opposite cylinders are linked on the same fluid circuits connecting the radial wave actuator to a sequential pump through the ports 21, 22, and 23.

In unpressurized state the flexspline—outer ring assembly exhibits circular shape concentric with the cylinder ring 20. When pressure is applied in a circuit the flexspline 12 is deformed along the direction of the pressurized cylinders causing the gear teeth to engage in that direction. FIG. 6 represents the wave actuator pressurized in port 21 inducing an oval shape spline with 14 and 15 as major and minor axes respectively.

The other two circuits rotate the major elliptical axis to their respective directions. The three 120° spaced axes of the cylinders are primary axes and their number directly determines the precision of motion. However, increasing the number of the cylinder pairs has practical limitations and significantly increases complexity.

The following method allows for doubling the number of axes for the same number of cylinders. The method is based on the observation that if a thin ring is pushed from inside out on opposite sides, it deforms aligning the major axis in that direction. But if the ring is squeezed in the same places, the major axis is reversed 180°. Thus, by pulling the diaphragms inward (rather then pushing outward) a new set of secondary axes is created normal to the primary ones, as represented in FIG. 6.

To avoid operating below the atmospheric pressure (for pulling), the diaphragms are preloaded so that in unpressurized state they exert elastic pull on the outer ring 19. This shifts the operating point above atmospheric pressure in a similar way that spring return pistons operate. This simple method uses the elasticity of the diaphragm in place of the classic return spring. Reducing the pressure below the central operating point causes the flexspline to engage at the secondary axis.

By independently operating each circuit the major axis can be oriented along any of the primary and secondary axes. With careful design of the sequential pump, coupled operation of the cylinders can orient the ellipse in arbitrary orientations providing smooth and precise motion of the rigid spline output.

Diaphragm cylinders are well suited for this application not only for their leak proof operation but also for implementing the spring return. For this reason the diaphragm should be manufactured of materials with good elastic properties. Moreover, as it can be easily observed in the exaggerated oval shape of FIG. 6, during motion the piston and cylinder axes lose coaxially. Thus, compliant (elastic) diaphragms are also accommodating this misalignment.

Figure 7:
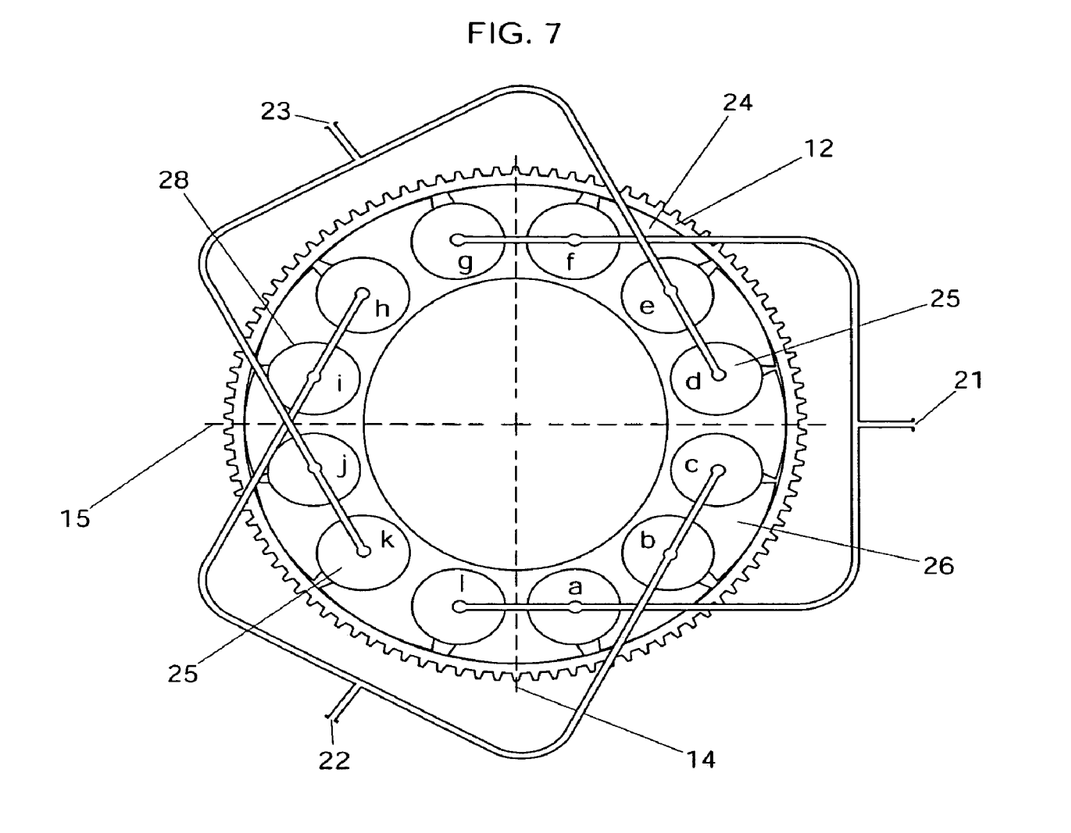
FIG. 7 is a plan view of a "tangential wave actuator" that replaces the elliptical wave generator of FIG. 5 with sequentially activated groups of inflatable cylinders that deform a wave generator ring that drives the flexspline.

A tangential wave actuator with a flexspline 12 is presented in FIG. 7. For simplicity the rigid, circular spline 11 has not been represented being similar to the one represented in FIG. 5. The tangential wave actuator comprises a special flexible wave ring 24 and a series of twelve inflatable cylinders 25a-25l (at least six inflatable cylinders are required). The flexspline 12 and the wave ring 24 are assembled so that relative tangential slipping is unrestricted at their points of contact. Pairs of four opposite cylinders are connected on the same fluid circuits connecting the actuator to a sequential pump through the ports 21, 22, and 23.

The wave generator ring 24 has a special construction presenting twelve equally spaced lobes 24a-24l attached to a thin and elastic inner structure or membrane 26. Semi-cylindrical cavities 27a-27l are created between adjacent lobes for placing the inflatable cylinders (pillows) 25a-25l. The outer surface of the lobes is constructed of elliptical surface that matches the region at the major axis of the flexspline ellipse.

Actuated oval shape of rotating major 14 and minor 15 axes is induced by sequentially pressurizing the inflatable cylinders 25a-25l. When pressure is applied to a circuit, opposite groups of inflatable pillows expand enlarging the gap between adjacent lobes. This deforms the wave generator ring to an oval shape with the major axis aligned in the direction of the pressurized axis. The orientation of the major axis is then rotated by sequential and coupled operation of the three circuits.

A hollow shaft cylindrical construction is common for the harmonic motor presented herein. This allows for mounting and/or passing the fluid circuit tubing for the inflatable cylinders through the inside of the motor.

In a prototype version of a harmonic motor with a tangential wave actuator, the rigid spline 11, the flexspline 12, and the wave generator 24 are constructed of plastic materials. The inflatable cylinders 25 are silicone rubber tubes with closed ends, which have been connected in three groups of circuits using ⅛" ID PVC tubing. The harmonic drive using a 100 teeth rigid spline and a 98 teeth flexspline implements a 50:1 transmission. The motor presents a hallow shaft, cylindrical shape. The overall size of the motor is 60 mm×25 mm with a 25 mm bore and it weighs only 50 g.

Prototype versions of this harmonic motor have been thoroughly tested to ensure that they are compatible with a wide rage of medical imaging environments. These motors have proven themselves to be the first Zone 1 multi-imager compatible motors. That is, the motor can precisely operate within the imager field of any known class of imaging equipment while the imager is acquiring images. This includes the class of MR imagers for which all existing types of motors (electric, piezoelectric, ultrasonic) are either incompatible or can not be set in close proximity of the magnetic field, operational or not. All previously reported MRI compatible robots inhabit MRI Zone 4 (one meter from iso-center or beyond the 20 m Tesla line) and, in consequence, have limited manipulation ability within Zones 1 and 2.

Figure 8A:
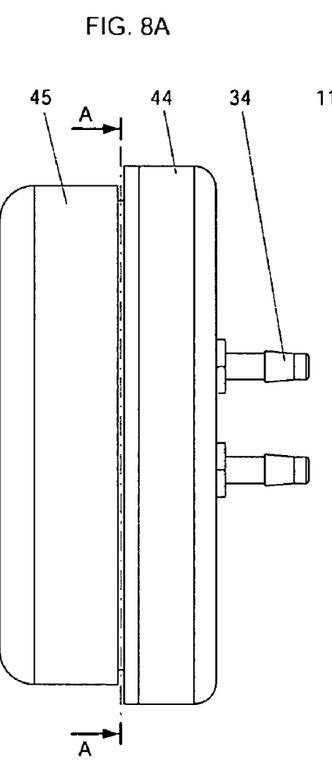
FIGS. 8A and 8B presents a side view and a cross sectional view of a harmonic planetary motor.
Figure 8B:
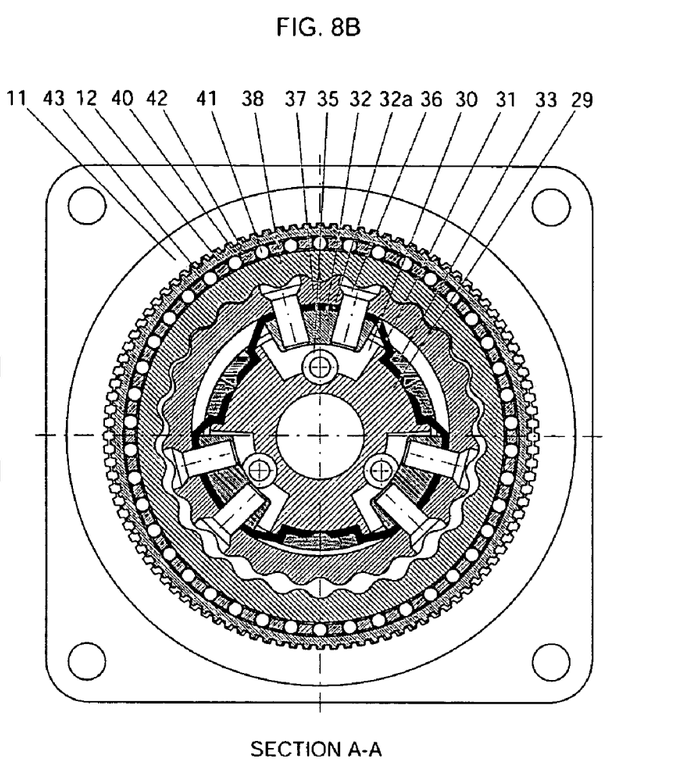
Figure 9:
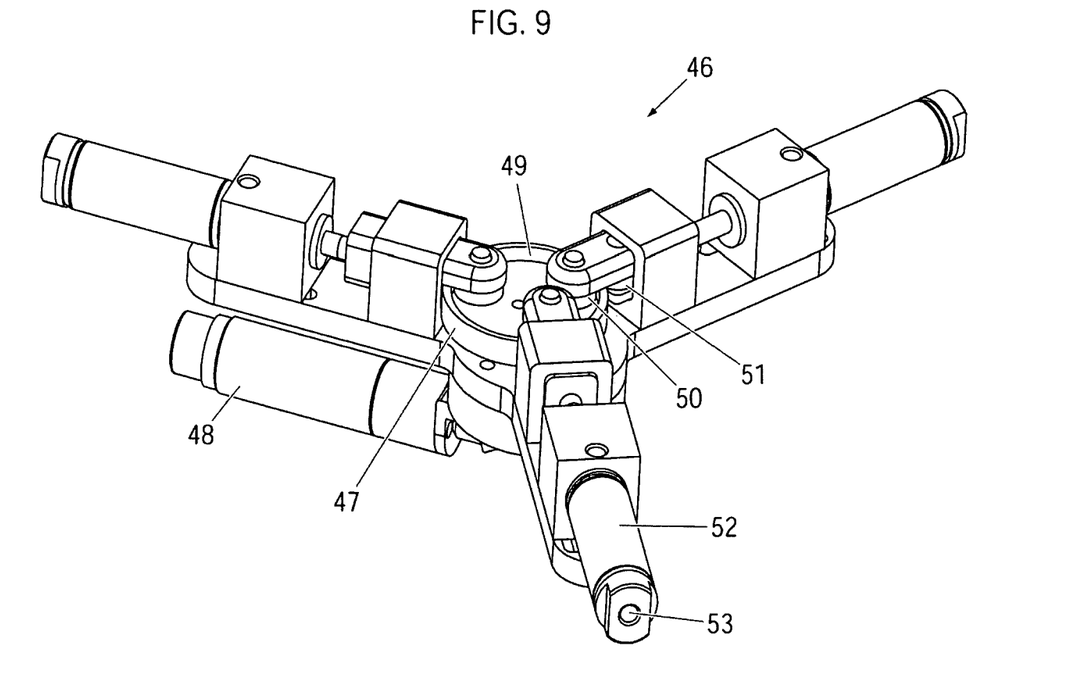
FIG. 9 shows an illustration of the pump that is used to drive a harmonic planetary motor.

FIGS. 8-9 show what is referred to herein as a harmonic planetary motor. It uses pneumatic/hydraulic pressure pulses to generate precise, backlash-free rotary motion.

As shown in the side and sectional views of FIGS. 8A and 8B, the central part of this embodiment is a cylinder body 29 presenting three radial cylinders 30. Three diaphragm 31 pistons 32 having top action surfaces 32a are attached to the cylinder body with the cylinder caps 33. Each cylinder is pressurized through a nozzle 34 linked to a port 35. The pistons are attached with the screws 36 to a rigid planetary gear 37 engaging an internal or wave generator gear 38.

The outer surface 39 of the wave generator gear 38 is elliptical acting as a wave generator for the next motion stage, the harmonic transmission. A ring bearing 40 with rollers 41 and a cage 42 acts between the outer surface 39 of the gear 38 and the inner surface 43 of the flexspline 12. The rigid spline 11 is attached to the case 44 of the module. The output of the motor is taken from the flexspline 12 through a passive spline 45 presenting an internal rigid spline.

This motor operates by fluid pressure being sequentially applied on the three diaphragm pistons 32 using a remotely located pneumatic/hydraulic commutation mechanism. This engages the planetary gear 37 in a coupled motion around the cylinder body 29, thus engaging the rigid wave generator gear 38. The planetary gear 37 does not rotate but rather balances on a round trajectory around the cylinder 29 in a quasi-translational motion, its rotation being prevented by the diaphragm 31 connections to the cylinder base 29.

For each full pressure cycle the wave generator gear 38 rotates with one tooth angle, assuming that the difference in the number of teeth in the planetary and wave generator gears is one. This rotation is further demultiplied through the combined action of the surrounding flexspline 12 and spline 11 so that the output of the module rotates through a spline tooth angle for each half turn of the wave generator 38, assuming that the difference in the number of teeth between the spline and flexspline two.

This motor assembly is constructed of nonmagnetic and dielectric materials such as mica-glass and toughened zirconia ceramics, polyimide plastics, and Buna-N rubber. Six small custom-made titanium screws 36 are also used.

The planetary gear 37 in this assembly is constructed such that it has one more tooth than the wave generator gear 38. Thus when the perimeter of the planetary gear 37 is caused to effectively walk the contact point with the wave generator's inner surface for a complete 360 degree revolution, the wave generator will advance through an angular rotation that is equal to 360 degrees divided by the number of teeth in the wave generator.

In this situation we have a harmonic planetary motor that acts to rotate a harmonic drive gear consisting of the circular spline 11, flexspline 12, and a wave generator 38. One of the advantages of this configuration is the higher degree of precision that can be obtained in controlling the angular output that is experienced in the rotation of the flexspline. The magnitude of the output is seen to be:

$$\alpha_{OUT}^{360°} = \frac{360°}{N_{WG}} \frac{(N_{RS} - N_{FS})}{N_{RS}} \text{ degrees}$$

where, $N_{WG}$, $N_{PG}$, $N_{RS}$, $N_{FS}$, $N_{PS}$ are the number of teeth for the wave generator 38, planetary gear 37, rigid spline 11, flex-spline 12, and a passive spline respectively, and where:

$N_{WG} = N_{PG} - 1$ $N_{RS} = N_{FS} + 2$ $N_{PS} = N_{FS}$

FIG. 9 shows an illustration of the pump that is used to drive this harmonic motor. In this situation, a pressure commutation mechanism is provided by three computer-controlled, proportional pneumatic valves generating a sequence of three sinusoidal waves of 120° phase shift. Such hydraulic actuation is capable of higher speed performance due to the incompressibility of the agent, and is also safer for surgical applications. The pump 46 comprises a cam 47 of cylindrical outer surface eccentrically mounted on a rotating shaft activated by the electric motor 48 through a bevel gear transmission. The inner part 49 of the cam presents a special shape (somewhat elliptical) so that two rollers 50 and 51 can simultaneously roll on the inner and outer sides of the cam implementing a dual acting (push-pull) piston stroke. The rotation of the cam causes the pistons of the three cylinders 52 to move in an eccentrically coupled phase, as required for the planetary motor. The pressure waves are then sent to the motor through the ports 53.

The motor of the present invention is also safe to use for medical applications since it is electricity free and presents a small size making it readily applicable for the construction of image-guided robots to operate within the confined space of various imagers, including closed bore tunnel types. This technology could potentially have a broad impact on the development of new image-guided motorized systems that could open new capabilities for diagnosis and treatment of prostate cancer and other diseases.

For example, this motor can be used for the construction of a multi-imager compatible robot for precise prostate access. Presently, prostate access for biopsy or therapy delivery can only be accomplished manually with or without the aid of template-like devices. A manual approach has intrinsic inaccuracies and is associated with variability among individual surgeons. A mechanism to precisely, repetitively, and reliably access the prostate is required to improve clinical outcome of classic procedures (i.e. biopsy, brachytherapy) and to create a basis upon which novel cancer therapies could be deployed and evaluated.

Figure 10A:
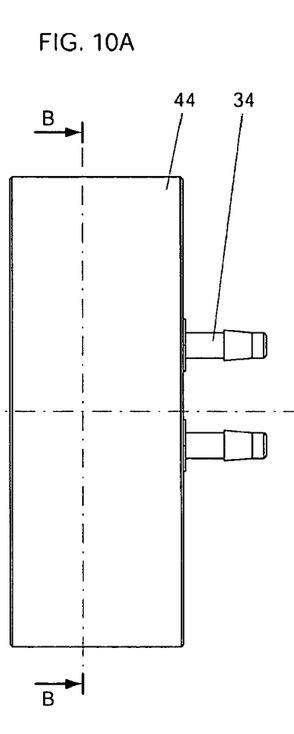
FIGS. 10A and 10B presents a side view and a cross sectional view of a planetary motor embodiment of the present invention.
Figure 10B:
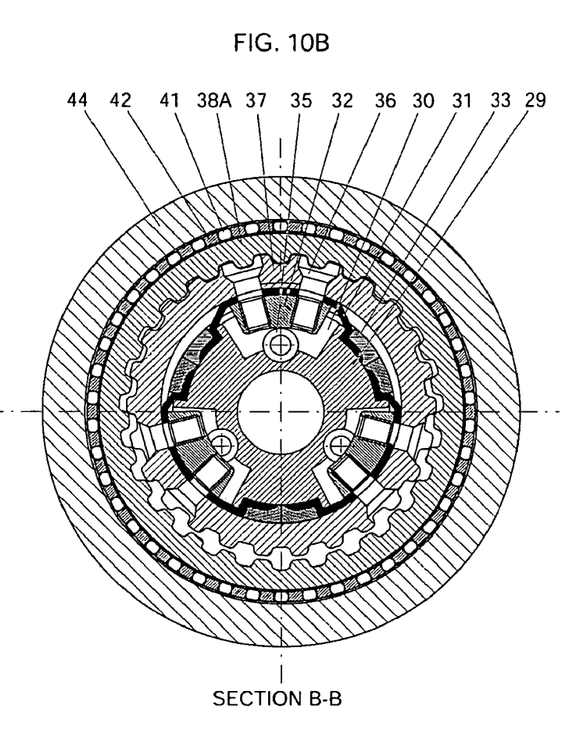

FIGS. 10A-10B show a preferred embodiment of the present invention. This embodiment is referred to herein as a planetary motor. It uses pneumatic/hydraulic pressure pulses to generate precise, backlash-free rotary motion.

This motor differs from most of the previously described motors by its replacement of a flexspline with a rigid, cylindrical, circular planetary gear 37. This gear is seen to have a bore with an external surface that has circumferentially distributed and radially directed teeth.

Located within the bore or interior of this gear is a drive means for applying a fluid pressure driven force to specified points on the gear's surface so as to cause it to move in planetary or translation-circular motion about the motor's centerline.

As shown in the side and sectional views of FIGS. 10A and 10B, the central part of the drive mechanism for this embodiment is a cylinder body 29 that is part of the means that are used to mount three radial cylinders 30. Three diaphragm 31 pistons 32 are attached to the cylinder body with cylinder caps 33. Each cylinder 30 is pressurized through a nozzle 34 linked to a port 35. The pistons 32 are attached with titanium screws 36 to the rigid planetary gear 37 which engages a cylindrical outer gear 38a which can provide the output of this motor.

This outer gear 38a is seen to have an internal surface with circumferentially distributed and radially directed teeth. At any instant, a plurality of the teeth of the planetary gear and outer gear are seen to intermesh. These teeth are configured so as to cooperate such that the translational-circular motion of the planetary gear causes the rotational movement of the outer gear 38a.

A suitable means for mounting this outer gear is a ceramic case 44 that contains a cylindrical bearing with ceramic rollers 41 and a plastic cage 42.

A hydraulic commutation pump 46, similar to the one previously described, with fluid pressure waves being sequentially applied on the three cylinders provides a suitable means for driving the planetary gear. The pump's pressure waves act on the pistons 32 to drive the planetary gear 37 in a coupled motion about the cylinder body 29. The planetary gear 37 does not rotate but translates on a circular trajectory about the cylinder body 29. The gear 38a advances one tooth on each pressure cycle.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention.

We claim:

1. A planetary motor comprising:
    a cylindrical outer gear having a bore with a centerline and an internal surface with circumferentially distributed and radially directed teeth,
    a means for mounting said outer gear such that said outer gear is constrained to move in rotational motion about the centerline of said outer gear,
    a cylindrical planetary gear having a bore and an external surface having circumferentially distributed and radially directed teeth,
    a means located within said planetary gear bore for applying a fluid pressure driven force to specified points on said planetary gear so as to cause said planetary gear to move in translational-circular motion about the centerline of said outer gear,
    wherein said planetary gear is configured to fit within the bore of said outer gear in such a manner that a plurality of said outer gear teeth and said planetary gear teeth intermesh, and
    wherein said planetary gear and outer gear teeth are configured so as to cooperate such that the translational-circular motion of said planetary gear causes said rotational movement of said outer gear.

2. The planetary motor as recited in claim 1 wherein said means for causing said translational-circular motion of said planetary gear including:
    a central ring having an outer, boundary surface and a center point,
    a plurality of diaphragm pistons, each of said pistons being mounted along the perimeter of said ring boundary surface and having a contact point with said planetary gear, and
    a means for supplying a specified flow of fluid through said pistons so as to cause said translational-circular motion.

3. The planetary motor as recited in claim 1 wherein said means for mounting said outer gear including:
    a cylindrical bearing, and
    a means for mounting said bearing.

4. The planetary motor as recited in claim 2 wherein said means for mounting said outer gear including:
    a cylindrical bearing, and
    a means for mounting said bearing.

5. A method of providing a planetary motor comprising the steps of:
    utilizing a cylindrical outer gear having a bore with a centerline and an internal surface with circumferentially distributed and radially directed teeth,
    mounting said outer gear such that said outer gear is constrained to move in rotational motion about the centerline of said outer gear,
    utilizing a cylindrical planetary gear having a bore and an external surface having circumferentially distributed and radially directed teeth,
    applying a fluid pressure driven force to specified points on said planetary gear so as to cause planetary gear to move in translational-circular motion about the centerline of said outer gear,
    configuring said planetary gear to fit within the bore of said outer gear in such a manner that a plurality of said outer gear teeth and said planetary gear teeth intermesh, and
    configuring said planetary gear and outer gear teeth so as to cooperate such that the translational-circular motion of said planetary gear causes said rotational movement of said outer gear.

6. The method of providing a planetary motor as recited in claim 5 wherein said step of causing said translational-circular motion of said planetary gear involves the steps of:
    utilizing a central ring having an outer, boundary surface and a center point,
    utilizing a plurality of diaphragm pistons, each of said pistons being mounted along the perimeter of said ring boundary surface and having a contact point with said planetary gear, and
    supplying a specified flow of fluid through said pistons so as to cause said translational-circular motion.

7. The method of providing a planetary motor as recited in claim 5 wherein said step of mounting said outer gear involves the steps of:
    utilizing a cylindrical bearing, and
    utilizing a means for mounting said bearing.

8. The method of providing a planetary motor as recited in claim 6 wherein said step of mounting said outer gear involves the steps of:
    utilizing a cylindrical bearing, and
    utilizing a means for mounting said bearing.

* * * * *

UNITED STATES PATENT AND TRADEMARK OFFICE
CERTIFICATE OF CORRECTION

| | |
|---|---|
| PATENT NO. | : 7,247,116 B2 |
| APPLICATION NO. | : 11/501098 |
| DATED | : July 24, 2007 |
| INVENTOR(S) | : Dan Stoianovici and Louis R. Kavoussi |

It is certified that error appears in the above-identified patent and that said Letters Patent is hereby corrected as shown below:

In the Specification

Col. 1, Line 16-19 please replace the second paragraph to read as follows:

STATEMENT AS TO FEDERALLY SPONSORED RESEARCH

This invention was made with United States Government support under Grant Number CA088232 awarded by the National Institutes of Health. The U.S. Government has certain rights in the invention.

Signed and Sealed this
Sixteenth Day of July, 2013

Teresa Stanek Rea
*Acting Director of the United States Patent and Trademark Office*